UNITED STATES PATENT OFFICE.

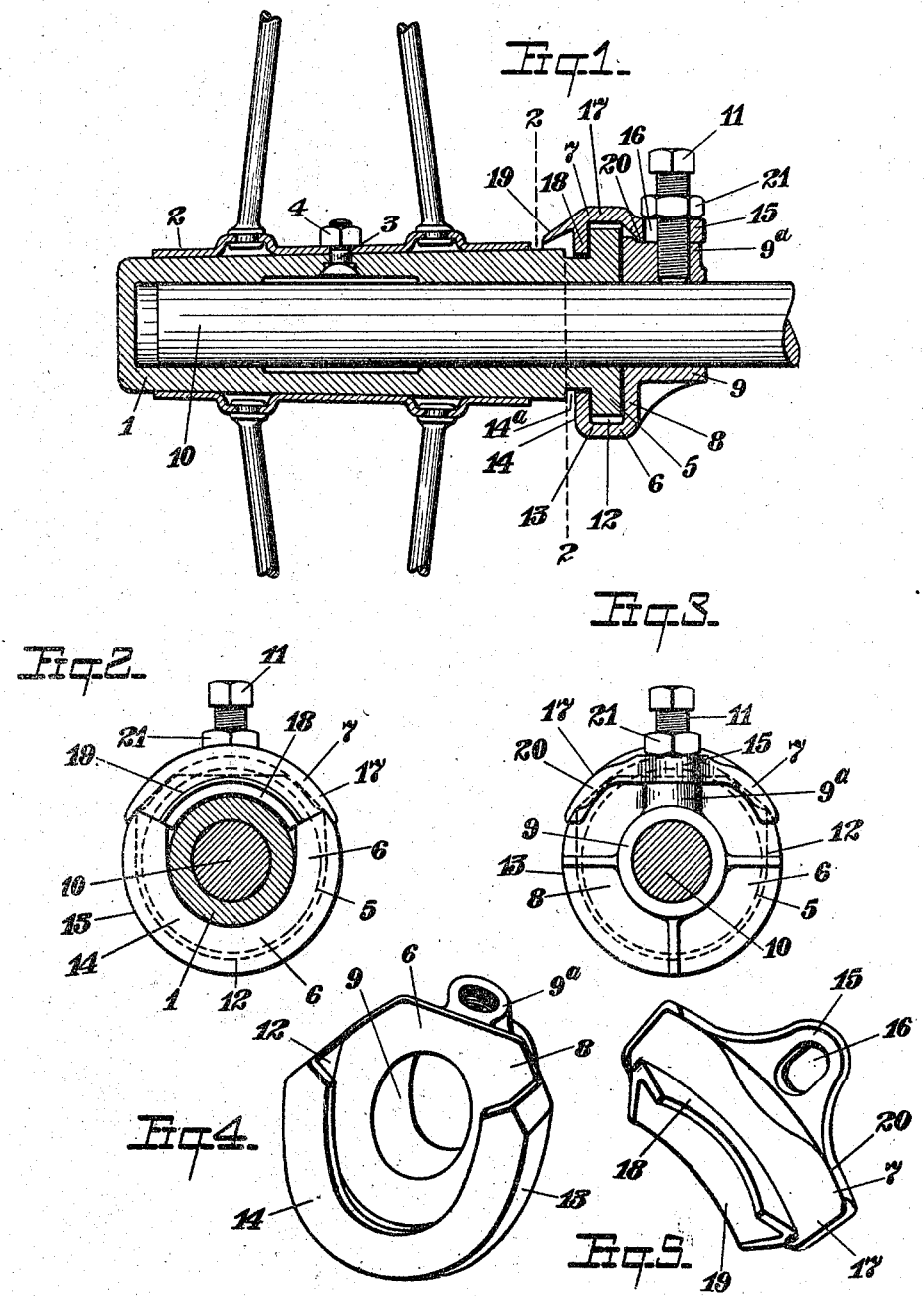

ERIC JOHNSON, OF MOLINE, ILLINOIS, ASSIGNOR TO DEERE AND COMPANY, OF MOLINE, ILLINOIS, A CORPORATION OF ILLINOIS.

SAND-BOX FOR WHEELS.

1,254,327. Specification of Letters Patent. Patented Jan. 22, 1918.

Application filed April 18, 1916. Serial No. 91,909.

*To all whom it may concern:*

Be it known that I, ERIC JOHNSON, a citizen of the United States, residing at Moline, in the county of Rock Island and State of Illinois, have invented certain new and useful Improvements in Sand-Boxes for Wheels, of which the following is a specification, reference being had therein to the accompanying drawing.

My invention relates to sand-boxes for wheels comprising means to exclude sand and dust from axle bearings and at the same time provide a means of lubrication. The objects of my invention will be more clearly pointed out in the following specification.

Referring to the drawings in which similar numerals indicate identical parts—

Figure 1 is a longitudinal section of a wheel hub and sleeve with the axle therein and my improved device in position.

Fig. 2 is a section on the line 2—2 of Fig. 1.

Fig. 3 is a rear view of Fig. 2.

Fig. 4 is a perspective view of the main body of the box, and

Fig. 5 is a perspective view of the cap.

The sleeve 1 is secured in the hub 2 by a bolt 3 passing through the wall of the sleeve and hub and secured by a nut 4. On the inner end of the sleeve 1 is a flange 5. The sand box is composed of two parts, a main body 6 and a segmental cap 7, the two parts when together forming a continuous box, the body 6 has a wall 8 provided with a collar 9, through which the axle 10 extends; a set screw 11 extends through a suitable threaded perforation in the collar 9 and a lug 9ª thereon and secures the collar to the axle 10. A cavity 12 is formed on the body 6 by extending a web 13 from the latter and forming thereon an inwardly projecting portion 14 parallel with the wall 8 and adapted to extend into a circumferential recess 14ª on the sleeve 1 adjacent the flange 5, the latter fitting loosely in the cavity 12 but of less diameter so as to provide sufficient space for lubricating material. The web 13 and the portion 14 are cut away to provide an opening so that a lubricant can be placed in the cavity 12, this opening I close with a cap 7 in the following manner; a projection 15, integral with the cap 7, extends over the lug 9ª and is provided with a slot 16 through which the set screw 11 passes freely. The cap 7 has a web portion 17 to form a continuation of the web 13, the web portion 17 having its ends overlapping the web 13 to form a close joint as shown in Figs. 2, 3 and 5, and a projection 18 which continues the portion 14 on the body 6 and closes the opening therein; from the projection 18 the cap has a flange 19 extending downwardly and outwardly and over the recess 14ª to shield the latter from sand and dust, a similar purpose being served by a lip 20 on the rear edge of the cap and extending below the top edge of the body 6.

The cap 7 is secured in place by a nut 21 on the set screw 11, the nut 21 not only holding the cap 7 in place but acting as a jam nut to prevent loosening of the set screw 11. As previously stated the cap 7 has a rearward extension 15 in which is a slot 16; the purpose of the slot 16 is to permit adjustment of the cap in a direction parallel with the axle to compensate for wear between the flange 13 of the box 1 and the projection 18, it being only necessary, in case of such wear, to loosen the nut 21 and move the cap to bring the projection 18 and the flange 13 into closer contact after which the nut 21 is again tightened to hold the cap 7 in place; it is also apparent that when the nut 21 is moved upward, the cap 7, because of the slot 16, has considerable free play and can be readily tilted, at an angle to the set screw 11, to raise it above the body 6 and swing it to one side in a substantially horizontal plane.

To give access to the cavity 12 the nut 21 is loosened and moved up on the set screw 11 a sufficient distance until the cap can be lifted from the body 6 and swung to one side out of the way, pivoting on the set screw 11; when the purpose has been served for which the cap has been removed from over the cavity 12, the cap can be readily replaced and again secured in position by the nut 21.

I am aware that sand boxes have been constructed and utilized having parts to engage with a flange on the axle box and presenting a cavity in which a lubricant can be placed, but I believe my device presents advantages not found in similiar devices and which I cover in the appended claims.

What I claim is—

1. A sand-box for wheels comprising a main body portion adapted to be secured on an axle, and a cap pivotally supported on the body portion to form a continuous box and capable of being swung laterally in a substantially horizontal plane.

2. A sand-box for wheels comprising a main body portion adapted to be secured on an axle, and a cap pivotally supported on the body portion to form a continuous box and adapted to be raised on its pivot and swung laterally.

3. A sand-box for wheels comprising a main body portion adapted to be secured on an axle, and a cap pivotally supported on the body portion to form a continuous box and adjustable in a direction parallel with the axle.

4. A sand-box for wheels comprising a main body portion adapted to be secured on an axle, a cap pivotally supported on the body portion to form a continuous box, a collar on the body portion to fit on the axle, and a set screw forming a pivot for the cap and adapted to secure the collar on the axle.

5. A sand-box for wheels comprising a main body portion adapted to be secured on an axle, a collar on the body portion to fit on the axle, a cap pivotally supported on the body portion and forming therewith a continuous box, an extension on said cap projecting over the collar, and a set screw passing through said projection and collar to secure the latter to the axle and to operate as a pivot for the cap.

6. A sand-box for wheels comprising a main body portion to be secured on an axle, a collar on the body portion to fit on the axle, a cap pivotally supported on the body portion and forming therewith a continuous box, an extension on said cap projecting over the collar, a slot in said extension, a set screw passing through said slot and collar to secure the latter to the axle and to operate as a pivot for the cap, and a nut on the set screw to hold the cap in place.

In testimony whereof I affix my signature, in presence of two witnesses.

ERIC JOHNSON.

Witnesses:
  JESSIE SIMSER,
  W. G. DUFFIELD.